(12) United States Patent
Bamba et al.

(10) Patent No.: US 8,447,333 B2
(45) Date of Patent: May 21, 2013

(54) SELECTIVE PROCESSING OF LOCATION-SENSITIVE DATA STREAMS

(75) Inventors: Bhuvan Bamba, Larchmont, NY (US);
Bugra Gedik, White Plains, NY (US);
Kun-Lung Wu, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/469,291

(22) Filed: May 11, 2012

(65) Prior Publication Data
US 2012/0276923 A1    Nov. 1, 2012

Related U.S. Application Data

(62) Division of application No. 12/575,371, filed on Oct. 7, 2009.

(51) Int. Cl.
*H04W 24/00* (2009.01)

(52) U.S. Cl.
USPC .......... 455/456.3; 455/456.1; 701/541; 701/516; 701/450

(58) Field of Classification Search
USPC . 455/456.1–457, 412.1–412.2; 701/445–447, 701/450–452, 491, 516, 540–541
See application file for complete search history.

(56) References Cited

U.S. PATENT DOCUMENTS

| 6,731,940 | B1 | 5/2004 | Nagendran |
| 7,818,016 | B2 | 10/2010 | Ahn |
| 2006/0040639 | A1 | 2/2006 | Karl et al. |
| 2007/0032240 | A1* | 2/2007 | Finnegan et al. ............. 455/445 |
| 2008/0096520 | A1 | 4/2008 | Benco et al. |
| 2009/0117921 | A1 | 5/2009 | Beydler et al. |
| 2011/0082846 | A1 | 4/2011 | Bamba et al. |
| 2012/0276930 | A1 | 11/2012 | Bamba et al. |

OTHER PUBLICATIONS

Mohamed F. Mokbel, et al., "SINA: Scalable Incremental Processing of Continuous Queries in Spatio-temporal Databases," *SIGMOD* 2004 Jun. 13-18, 2004, Paris, France, copy consists of 12 unnumbered pages.

(Continued)

*Primary Examiner* — Marcos Torres
(74) *Attorney, Agent, or Firm* — William Stock

(57) ABSTRACT

A method for processing a first data stream specifying locations of a user at different times and a second data stream specifying values of a monitored attribute at a location of interest at different times includes: receiving a location-centric trigger specifying at least one spatial predicate condition relative to the location of interest and at least one non-spatial predicate condition relevant to the location of interest, calculating a safe region that includes locations whose probability of satisfying the spatial predicate condition falls below a first threshold, calculating a safe value container that includes values whose probability of satisfying the non-spatial predicate condition falls below a second threshold, and processing the first data stream and the second data stream against the location-centric trigger, by considering only those locations that are not contained within the safe region and only those values that are not contained within the safe value container.

12 Claims, 12 Drawing Sheets

OTHER PUBLICATIONS

Haibo Hu, et al., "A Generic Framework for Monitoring Continuous Spatial Queries over Moving Objects," *SIGMOD* 2005 Jun. 14-16, 2005, Baltimore, Maryland, copy consists of 12 unnumbered pages.

Bhuvan Bamba, et al., "Distributed Processing of Spatial Alarms: A Safe Region-based Approach," 2009 29th IEEE International Conference on Computing Systems, 2009, pp. 207-214.

Nesime Tatbul, et al., "Load Shedding in a Data Stream Manager," Proceedings of the 29th VLDB Conference, Berlin, Germany, 2003, copy consists of 12 unnumbered pages.

Bugra Gedik, et al., "LIRA: Lightweight, Region-aware Load Shedding in Mobile CQ Systems," CERCS, College of Computing, Georgia Tech, IEEE 2007, copy consists of 9 unnumbered pages.

Jun Zhang, et al., "Location-based Spatial Queries," *ACM SIGMOD'*2003, Jun. 9-12, San Diego, California, 2003, copy consists of 12 unnumbered pages.

Xiaohui Yu, et al. "Monitoring k-Nearest Nearest Neighbor Queries Over Moving Objects," Proceedings of the 21st International Conference on Data Engineering (ICDE 2005), copy consists of 12 unnumbered pages.

Pamela J. Ludford, et al., "Because I Carry My Cell Phone Anyway: Functional Location-Based Reminder Applications," Chi 2006 Proceedings, Everyday Use of Mobiles, Apr. 22-27, 2006, Montreal, Quebec, Canada, pp. 889-898.

\* cited by examiner

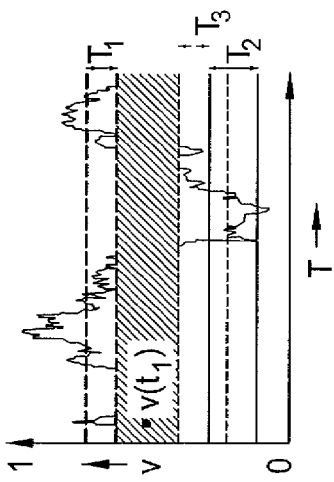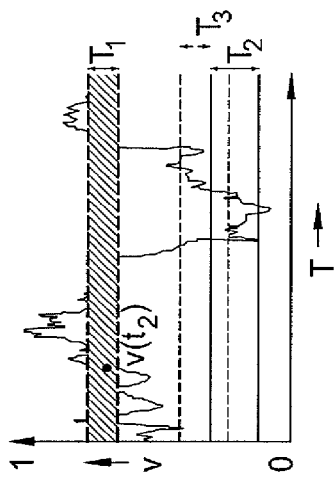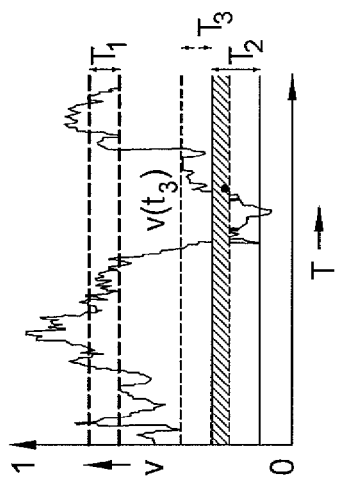
FIG. 3B

SELECTIVE PROCESSING OF LOCATION-SENSITIVE DATA STREAMS

CROSS REFERENCE TO RELATED APPLICATION

This application is a division of co-pending U.S. patent application Ser. No. 12/575,371, filed Oct. 7, 2009, which is herein incorporated by reference in its entirety.

BACKGROUND OF THE INVENTION

The present invention relates generally to data stream processing applications, and relates more specifically to the processing of location-based data streams to allow monitoring of location-sensitive data.

The availability of inexpensive location-sensing technologies and the advancement of wireless communication technology have led to an explosion in location-based services. At the same time, other technological advancements have led to an abundance of location-sensitive data. Within this context, information needs may be expressed using location-centric triggers.

For example, a user of a mobile device may install a location-centric trigger in a location-based monitoring server for a particular gas station. This trigger may specify spatial and non-spatial predicate conditions for activating the trigger. For example, the user may request that the trigger be activated when the user is within one mile of the gas station and the gas price is below four dollars. In this case, "within one mile of the gas station" is a spatial predicate condition, while "the gas price is below four dollars" is a non-spatial predicate condition. Data relating to the gas price is "location-sensitive" because it is tied to a particular location (i.e., the gas station).

The location-based information monitoring server receives information in the form of data streams that arrive continuously, rapidly, and in real time from multiple sources. In the above example, these data streams may include, for example, a first data stream identifying the location of the user at various times and a second data stream identifying the price of gas at various times. The data streams are processed against the user's location-specific trigger in order to determine when the trigger should be activated.

Simplistic systems process the data streams as they are received. However, if the location-based information monitoring system receives a large number of data streams and/or processes location-centric triggers for a large number of users, processing data streams as they arrive may delay the delivery of information to the users because processing resources are wasted on large amounts of irrelevant data (i.e., data that does not activate any of the triggers).

SUMMARY OF THE INVENTION

A method for processing a first data stream specifying locations of a user at different times and at least a second data stream specifying values of a monitored attribute at a location of interest at different times includes: receiving a location-centric trigger specifying at least one spatial predicate condition relative to the location of interest and at least one non-spatial predicate condition relevant to the location of interest, calculating a safe region that includes locations whose probability of satisfying the spatial predicate condition falls below a first threshold, calculating one or more safe value containers that include values whose probabilities of satisfying the non-spatial predicate conditions fall below one or more second thresholds, and processing the first data stream and the at least a second data stream against the location-centric trigger, by considering only those locations that are not contained within the safe region and only those values that are not contained within respective safe value containers for the corresponding non-spatial predicate conditions.

BRIEF DESCRIPTION OF THE DRAWINGS

So that the manner in which the above recited features of the present invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 3B is a graph illustrating exemplary one-dimensional value domains associated with each of a plurality of monitored attributes;

DETAILED DESCRIPTION

In one embodiment, the invention is a method and apparatus for selective processing of location-sensitive data streams. Embodiments of the invention implement a selective approach to the processing of incoming data streams, as opposed to processing the incoming data streams on delivery.

In particular, stream data with a low probability of activating a location-centric trigger is discarded without being processed, allowing more server resources to be devoted to the processing of stream data with a greater probability of activating a trigger.

Embodiments of the invention rely on the use of "safe regions" for location-based stream data and "safe value containers" for monitored stream data, where data is "safe" if it can be discarded (because it is not likely to activate a trigger). Specifically, a "safe region" is a physical location in which a user's location-centric triggers are not likely to be activated. For instance, referring to the gas station example discussed in the background, the trigger's safe region encompasses any location outside of an approximately one-mile radius from the gas station. A "safe value container" is a range of values for a monitored attribute that is not likely to activate the user's location-centric triggers. For instance, referring again to the gas station example, the trigger's "safe value container" includes any gas prices above four dollars. The probability threshold for the location data and the monitored data may be the same, or each may have a different threshold. For ease of explanation, discussion of the invention herein refers to a single safe value container. However, those skilled in the art will appreciate that a location-centric trigger may be associated with a plurality of safe value containers (e.g., one safe value container for each non-spatial predicate condition). Thus, any instance discussed herein in which reference is made to a single safe value container inherently contemplates the existence of multiple safe value containers.

As discussed above, each mobile user $u_i \epsilon U$ expresses her location-based information needs in the form of location-centric triggers $t_{i,j} \epsilon T$ at a location of interest $l_j \epsilon L$. In one embodiment, the triggers are installed at an information monitoring server that receives location updates from mobile users as well as data updates from other data sources and processes these updates to determine if any relevant triggers need to be activated. The term "mobile user" and the designation $u_i$ are used interchangeably herein to refer to both the user of a mobile device and the mobile device itself (e.g., a mobile global positioning system (GPS) device, a cellular telephone, a personal digital assistant, a laptop computer, a satellite radio receiver, or the like).

Figure 1:
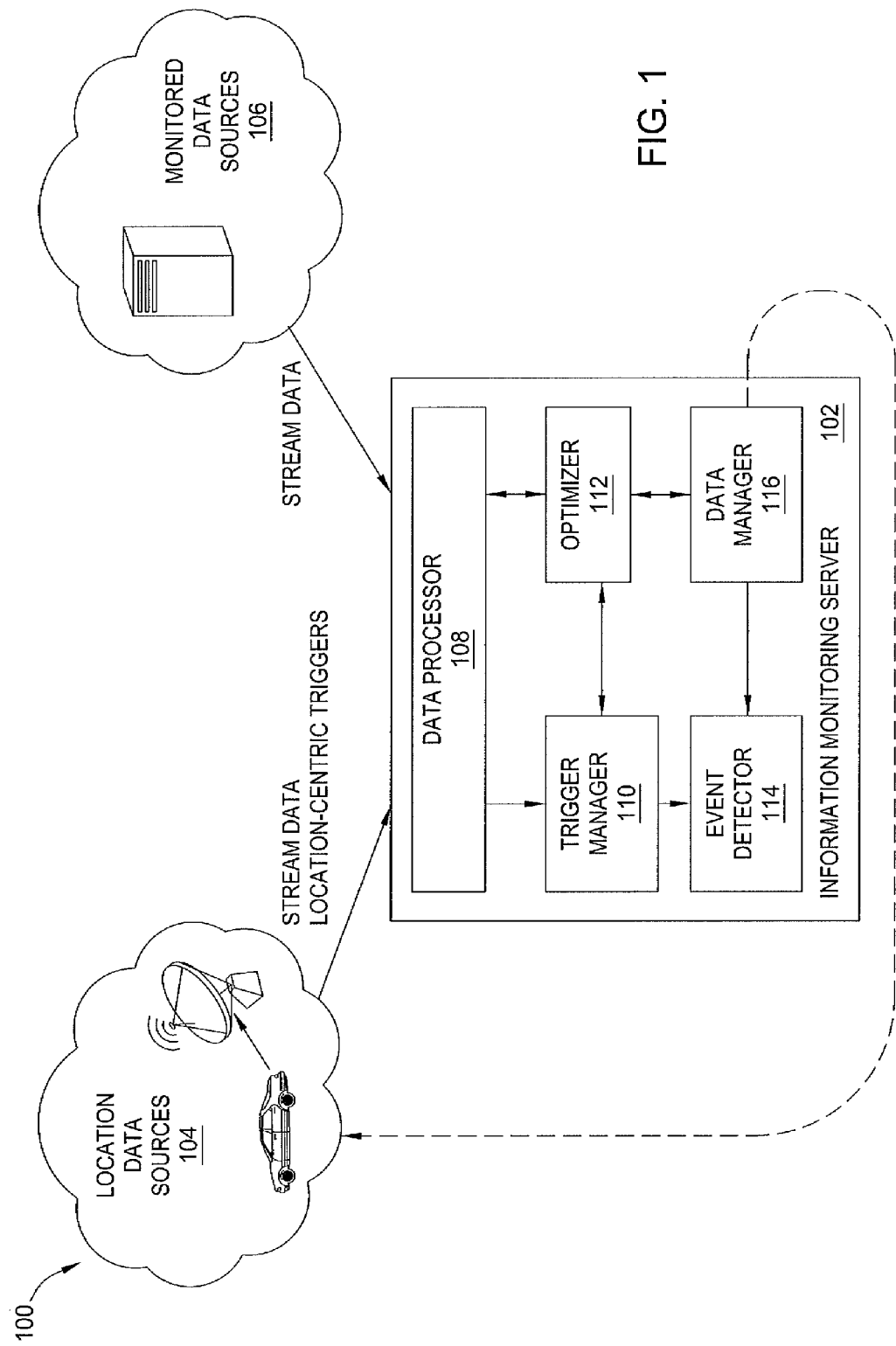
FIG. 1 is a schematic diagram illustrating one embodiment of a location-based information monitoring system, according to the present invention.

FIG. 1 is a schematic diagram illustrating one embodiment of a location-based information monitoring system 100, according to the present invention. As illustrated, the system 100 comprises an information monitoring server 102 and a plurality of data sources that provide data updates to the information monitoring server 102. These data sources include location data sources 104 and monitored data sources 106.

The location data sources 104 comprise one or more base stations that are in communication with mobile users and that provide location data relevant to the mobile users (i.e., the locations of the mobile users at given times). Each of the location data sources 104 delivers updates in the form of location data streams from multiple mobile users to the information monitoring server 102. A location data stream contains tuples of the form $l_{u_i}(t) = \langle u_i, t, x, y, \rangle$, which indicates the location of the mobile user $u_i$ in two-dimensional coordinate space at time t. In one embodiment, the location data sources 104 operate within a wireless environment in which the base stations communicate directly with the mobile users.

The monitored data sources 106 comprise one or more information delivery systems that provide monitored data relevant to one or more locations of interest (e.g., gas prices at a specified gas station). Each of the monitored data sources 106 delivers updates in the form of monitored data streams relevant to the monitored data at different locations of interest to the information monitoring server 102. A monitored data stream contains tuples of the form $m_{l_j}(t) = \langle l_j, t, a_1, a_2, \ldots, a_r \rangle$, which contains r-dimensional monitored data. $a_k$, $k \epsilon [1 \ldots r]$ is a value in domain $D_k$, which represents the value of the $k^{th}$ monitored attribute at location of interest $l_j$ at time t. In one embodiment, the monitored data sources 106 operate within an Ethernet environment.

The information monitoring server 102 maintains a set T of location centric triggers. Each trigger $t_{i,j} \epsilon T$ represents a trigger installed by mobile device user $u_i \epsilon U$ on location of interest $l_j \epsilon L$. The information monitoring server 102 receives updates from the location data sources 104 and the monitored data sources 106 in the form of streaming data, processes the updates, and activates location-centric triggers in response to the updates. As illustrated, the information monitoring server 102 comprises five main components, each of which may individually comprise a processor. These components include: a data processor 108, a trigger manager 110, an optimizer 112, an event detector 114, and a data manager 116.

The data processor 108 receives updates directly from the location data sources 104 and the monitored data sources 106. In addition, the data processor 108 receives requests to install new location-centric triggers from the location data sources 104. The data processor 108 classifies the updates according to their sources (e.g., location data source or monitored data source) and then provides the classified updates to the optimizer 112. The requests to install new location-centric triggers are forwarded by the data processor 108 to the trigger manager 110.

The optimizer 112 receives the classified updates from the data processor 108 and determines whether the classified updates should be processed. As discussed in further detail below, the determination as to whether a classified update should be processed is based on the probability that the classified update will activate (or not activate) a location-centric trigger for at least one of the users. In one embodiment, the optimizer 112 facilitates this determination by computing "safe regions" for the location data and "safe value containers" for the monitored data. The optimizer 112 delivers the safe regions and safe value containers to the data manager 116.

The trigger manager 110 receives the requests to install new location-centric triggers from the data processor 108 and handles the addition and removal of triggers in accordance with these requests. In addition, the trigger manager 110 coordinates with the optimizer 112 and the event detector 114 in order to determine whether any triggers should be activated in response to incoming updates.

The data manager 116 receives the safe regions and safe value containers from the optimizer 112 and communicates the safe regions back to the relevant mobile users for use in self-monitoring, discussed in further detail below. The data manager 116 also stores the safe value containers. In one embodiment, safe value containers are not communicated to the monitored data sources 106 because it is assumed that the monitored data sources 106 do not possess computational power that can be devoted to self-monitoring; however, in other embodiments, the data manager 116 communicates the safe value containers to the monitored data sources 106. In addition, the data manager 116 receives updates for processing from the optimizer 112.

The data manager 116 delivers the safe region information, safe value container information, and updates to the event detector 114. In addition, the event detector 114 receives trigger information from the trigger manager 110. The event detector 114 determines whether to activate a trigger by processing the data received from the data manager 116 against the data provided by the trigger manager 110.

Figure 2:
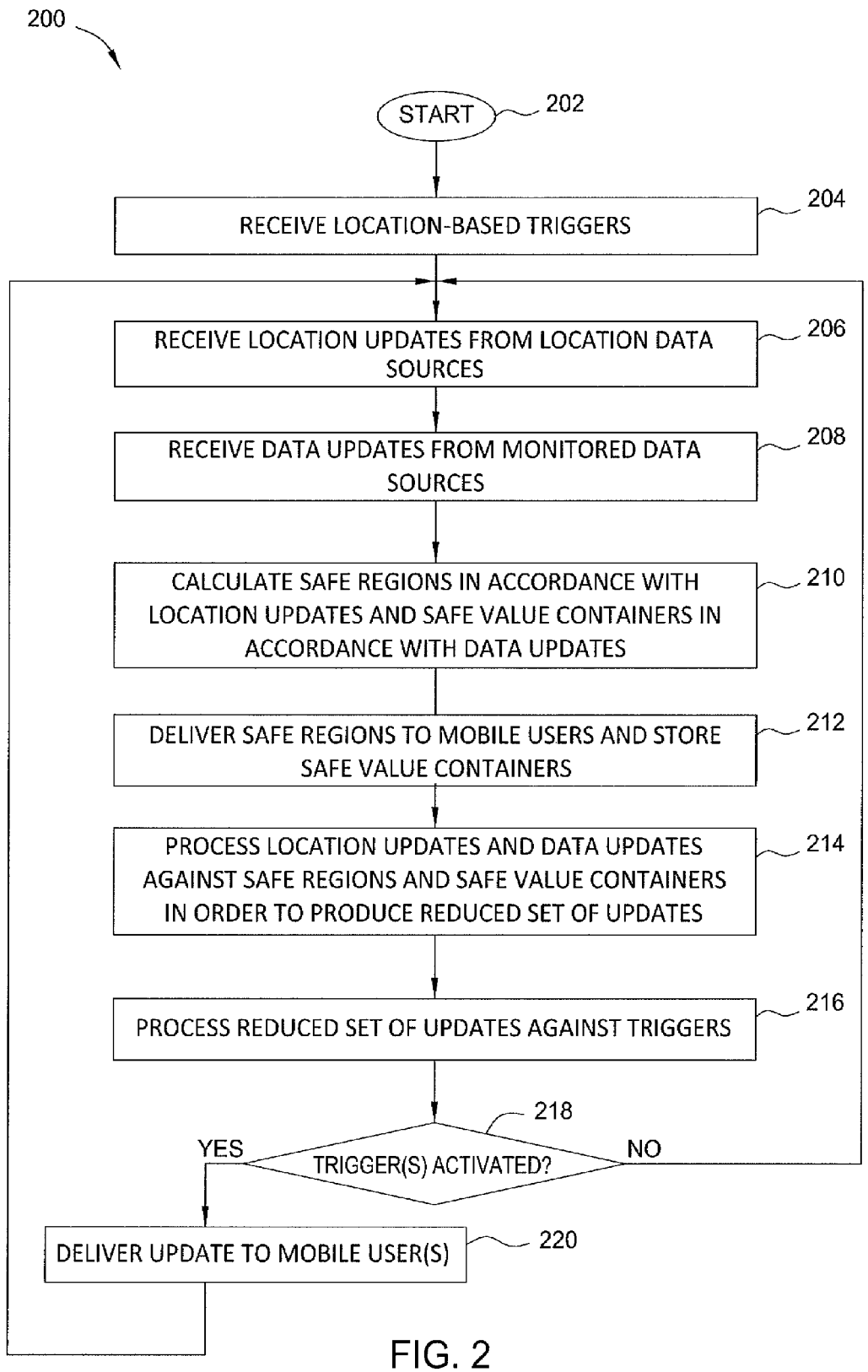
FIG. 2 is a flow diagram illustrating one embodiment of a method for processing location-sensitive data streams, according to the present invention.

FIG. 2 is a flow diagram illustrating one embodiment of a method 200 for processing location-sensitive data streams, according to the present invention. The method 200 may be implemented, for example, by the information monitoring server 102 illustrated FIG. 1. As such, reference is made in the discussion of the method 200 to various components of the information monitoring server 102. However, it is understood that the method 200 is not limited to operation in conjunction with the information monitoring server 102, and may readily be deployed in systems having different configurations from that illustrated.

The method 200 is initialized at step 202 and proceeds to step 204, where the data processor 108 receives one or more location-centric triggers from one or more mobile users. In one embodiment, these location-centric triggers are received from one or more of the location data sources 104, such as base stations that are in communication with mobile users. Each location-centric trigger specifies a set of spatial and non-spatial predicate conditions for activating the trigger (e.g., "Notify User A when User A is within one mile of gas station G and the gas price is below four dollars"). In one embodiment, these triggers are expressed in the form of <monitored attribute> <op> <value>, where <op>$\in \{<, >, \leq, \geq\}$, combined using the logical ^ operator. For instance, User A's trigger can be expressed as $t_{A,G} = (X \geq -1 \wedge x \leq 1 \wedge y \geq -1 \wedge y \leq 1 \wedge p < 4)$, where the first four constraints express the spatial trigger region using the minimum bounding rectangle of a circle of one-mile radius around the gas station G, assuming that the gas station is located at the origin of the coordinate space. The last constraint expresses the gas price requirement. The predicate conditions specified on the spatial region will be a common feature of all triggers; however, different locations of interest will have different monitored attributes associated with them. In one embodiment, the method 200 assumes that a trigger specifies predicate conditions on all of the monitored attributes associated with the corresponding location of interest.

In one embodiment, the triggers are classified into one of three categories depending on their relevance to the population of mobile users: private, public, or shared. Considering a location-based information monitoring system with n mobile users, private triggers $t_{i,j}^{private} \in T$ are relevant to a single mobile user, where $i \in [1 \ldots n]$ and $|i|=1$. Shared triggers $t_{i,j}^{shared} \in T$ are relevant to at least two mobile users under the constraints $i \in [1 \ldots n]$ and $2 \leq |i| \leq n'$, where n' specifies system limitations on the maximum number of mobile users permitted to share a trigger. Public triggers $t_{i,j}^{public} \in T$ are relevant to all of the mobile users, $|i|=n$. In a further embodiment, an additional constraint specifies that a mobile user may have only one trigger relevant to a given location of interest $l_j$.

In step 206, the data processor 108 receives one or more location updates from the location data sources 104. As discussed above, the location updates indicate the physical locations of the mobile users at given times (e.g., where user A is at time t).

In step 208, the data processor 108 receives one or more data updates from the monitored data sources 106. As discussed above, the data updates indicate monitored data relevant to one or more locations of interest (e.g., the gas price at gas station G at time t).

In step 210, the optimizer 112 computes one or more safe regions in accordance with the location updates and one or more safe value containers in accordance with the data updates. As discussed above, a safe region is a physical location in which a mobile user's location-centric triggers are not likely to be activated, while safe value container is a range of values for a given parameter that is not likely to activate any of the mobile users' location-centric triggers.

The safe region for each user $u_i$ in a set of users U may be defined as $\psi(u_i)$. One specific embodiment of a method for calculating a safe region is discussed in greater detail with respect to FIG. 6, while one specific embodiment of a method for calculating a safe value container is discussed in greater detail with respect to FIG. 8.

In step 212, the data manager 116 delivers the safe regions to the mobile users (e.g., via the base stations within the location data sources 104). The data manager 116 also stores the safe value containers (e.g., locally).

In step 214, the event detector 114 processes the location updates and the monitored data updates against the safe regions and the safe value containers in order to produce a reduced set of updates. In particular, any location updates that indicate mobile user locations within the safe regions are discarded. This is because locations within the safe regions have zero probability of activating any location-centric triggers. Once the safe regions have been delivered to mobile users (e.g., as in step 212), the number of location updates that have to be discarded should be greatly reduced. This is because the mobile users can use the safe region information to control when they send location updates, as discussed in further detail in connection with FIG. 4. In addition, data updates that indicate data values falling within the safe value containers are discarded. This is because data values falling within the safe value containers have a zero probability of activating any triggers.

In step 216, the event detector 114 processes the reduced set of updates against the location-centric triggers in order to determine whether any of the triggers should be activated. A trigger is to be activated when all of its spatial and non-spatial predicate conditions are satisfied. Thus, following the above example, User A's trigger $t_{A,G}$ is activated when the location updates indicate that User A's current location is within one mile of gas station G and the data updates indicate that the price of gas at gas station G is below four dollars.

In step 218, the event detector 114 determines whether any triggers should be activated, based on the processing performed in step 216. If the event detector 114 concludes in step 218 that no triggers should be activated, the method 200 returns to step 206, and the data processor 108 continues to receive location updates and data updates.

Alternatively, if the event detector 114 concludes in step 218 that at least one trigger should be activated, the method 200 proceeds to step 220, and the event detector 114 activates the trigger(s) by delivering an update to the relevant mobile user(s) (e.g., by informing User A that he is within one mile of gas station G and that the gas price at gas station G is under four dollars). The method 200 then returns to step 206, and the data processor 108 continues to receive location updates and data updates.

The method 200 therefore employs a selective processing approach that drops data updates with less than a threshold probability (e.g., zero probability) of activating any relevant triggers. The probability of a location data update $l_{u_i}(t)$ from a location data source being able to activate a trigger $t_{i,j}$, denoted by $Pr[l_{u_i}(t) \Rightarrow t_{i,j}]$, is dependent on two factors: (1) the probability of the mobile user entering the spatial region $R_{i,j}^S$ associated with the trigger $t_{i,j}$, denoted by $Pr[l_{u_i}(t) \in R_{i,j}^S]$; and (2) the probability of monitored attribute values $m_{l_j}(t')$ at the location of interest $l_j$ satisfying the non-spatial predicate conditions specified by the installed trigger, denoted by $Pr[m_{l_j}(t') \in R_{i,j}^{NS}]$. Here, t' is the time instant at which the latest location update from the location of interest $l_j$ has been received by the location monitoring server, such that t'<t. Thus, one has:

$$Pr[l_{u_i}(t) \Rightarrow t_{i,j}] = f(Pr[l_{u_i}(t) \in R_{i,j}^S], Pr[m_{l_j}(t') \in R_{i,j}^{NS}]) \quad \text{(EQN. 1)}$$

Similarly, the probability of a monitored data update $m_{l_j}(t)$ from a monitored data source being able to activate a trigger $t_{i,j}$, denoted by $Pr[m_{l_j}(t) \Rightarrow t_{i,j}]$, is dependent on two factors: (1) the probability of the monitored attribute values $m_{l_j}(t)$ at the location of interest $l_j$ satisfying the non-spatial predicate conditions $R_{i,j}^{NS}$ on the trigger $t_{i,j}$, denoted by $Pr[m_{l_j}(t) \in R_{i,j}^{NS}]$; and (2) the probability of the mobile user location $l_{u_i}(t')$ lying within the region $R_{i,j}^S$ associated with the trigger $t_{i,j}$, denoted by $Pr[l_{u_i}(t') \in R_{i,j}^S]$. Thus, one has:

$$Pr[m_{l_j}(t) \Rightarrow t_{i,j}] = f(Pr[m_{l_j}(t) \in R_{i,j}^{NS}], Pr[l_{u_i}(t') \in R_{i,j}^S]) \quad \text{(EQN. 2)}$$

In some embodiments, the location-based information monitoring system 100 has installed therein a large number of triggers associated with each mobile user $u_i$ and each location of interest $l_j$. In this embodiment, the set of triggers $T_i \subset T$ is relevant to the mobile user $u_i$. Any location update from the mobile user $u_i$ should be processed by the information monitoring server only if the probability of activating at least one trigger in the set $T_i$, denoted by $Pr[l_{u_i}(t) \Rightarrow_{\geq 1} T_i]$, is greater than a predefined threshold (e.g., zero). Thus, one has:

$$Pr[l_{u_i}(t) \Rightarrow_{\geq 1} T_i] = 1 - Pr[l_{u_i}(t) \not\Rightarrow T_i] \quad \text{(EQN. 3)}$$

where $Pr[l_{u_i}(t) \not\Rightarrow T_i]$ denotes the probability of not activating any relevant triggers in the set $T_i$. Assuming that each trigger in the set $T_i$ is independent of all other triggers, one has:

$$Pr[l_{u_i}(t) \not\Rightarrow T_i] = \prod_{j=1}^{|T_i|}(1 - Pr[l_{u_i}(t) \Rightarrow t_{i,j}]) \quad \text{(EQN. 4)}$$

$$= \sum_{j=1}^{|T_i|}(1 - Pr[l_{u_i}(t') \in R_{i,j}^S] \cdot Pr[m_{l_j}(t') \in R_{i,j}^{NS}]) \quad \text{(EQN. 5)}$$

$$= \sum_{j=1}^{|T_i|}\left(1 - Pr[l_{u_i}(t') \in R_{i,j}^S] \cdot \prod_{k=1}^{Dim(R_{i,j}^{NS})} Pr[a_k(t') \in R_{i,j}^k]\right) \quad \text{(EQN. 6)}$$

The monitored attributes associated with a trigger $t_{i,j}$ are considered to be independent of each other. This allows one to represent the probability of the non-spatial predicate conditions being satisfied as a product of the probabilities along each dimension in EQN. 6.

Similarly, in one embodiment, the set of triggers $T_j \subset T$ is relevant to the location of interest $l_j$; any monitored update for this location of interest $l_j$ should be processed by the information monitoring server 102 only if the probability of activating at least one trigger in the set $T_j$ is greater than a predefined threshold (e.g., zero). The probability that none of the triggers in the set $T_j$ will be activated is given by:

$$Pr[m_{l_j}(t) \not\Rightarrow T_j] = \prod_{i=1}^{|T_j|}(1 - Pr[m_{l_j}(t) \Rightarrow t_{i,j}]) \quad \text{(EQN. 7)}$$

$$= \prod_{i=1}^{|T_j|}(1 - Pr[m_{l_j}(t) \in R_{i,j}^{NS}] \cdot Pr(l_{u_i}(t') \in R_{i,j}^S]) \quad \text{(EQN. 8)}$$

$$= \prod_{i=1}^{|T_j|}\left(1 - \prod_{k=1}^{Dim(R_{i,j}^{NS})} Pr[a_k(t) \in R_{i,j}^k] \cdot Pr[l_{u_i}(t') \in R_{i,j}^S]\right) \quad \text{(EQN. 9)}$$

It can be seen from EQNs. 6 and 9 that the probability of a location data update or a monitored data update activating any relevant trigger is zero if and only if: (1) $Pr[l_{u_i}(t') \in R_{i,j}^S] = 0$, $\forall j | t_{i,j} \in T_i$; or (2) $Pr[a_k(t) \in R_{i,j}^k] = 0$ for any of the k monitored attributes $\forall i | t_{i,j} \in T$. The safe regions for the spatial locations and the safe value containers for the non-spatial attributes allow one to quickly determine the time instants when these two conditions on probability are satisfied.

A safe region $\psi(u_i)$ for each mobile user $u_i$ can thus be defined such that as long as the mobile user's location lies within the safe region, the condition $Pr[l_{u_i}(t') \in R_{i,j}^S] = 0$ holds $\forall j | t_{i,j} \in T_i$. Consequently, any location data updates from the mobile user $u_i$ may be discarded without processing, since the probability of any relevant triggers being activated by these updates is zero. Thus:

$$Pr[l_{u_i}(t) \Rightarrow_{\geq 1} T_i | l_{u_i}(t) \in \psi(u_i)] = 0 \quad \text{(EQN. 10)}$$

A safe value container can be defined for each monitored attribute $a_j^k$, $k \in [1 \ldots r]$, relevant to each location of interest $l_j$, such that as long as the value of a monitored attribute falls within one of its safe value containers, denoted by $\delta_k(l_j)$, the condition $Pr[m_{l_j} \in R_{i,j}^k] = 0$ holds $\forall i | t_{i,j} \in T$. As long as the value of even one of the monitored attributes associated with the location of interest $l_j$ lies within a safe value container, corresponding monitored data updates for the location of interest $l_j$ may be discarded without processing, since the probability of any relevant triggers being activated by these updates is zero. Thus:

$$Prm_{l_j}[l_{u_i}(t) \Rightarrow_{\geq 1} T_i | \exists k \in [1 \ldots r], a_j^k \in \delta_k(l_j)] = 0 \quad \text{(EQN. 11)}$$

Figure 3A:
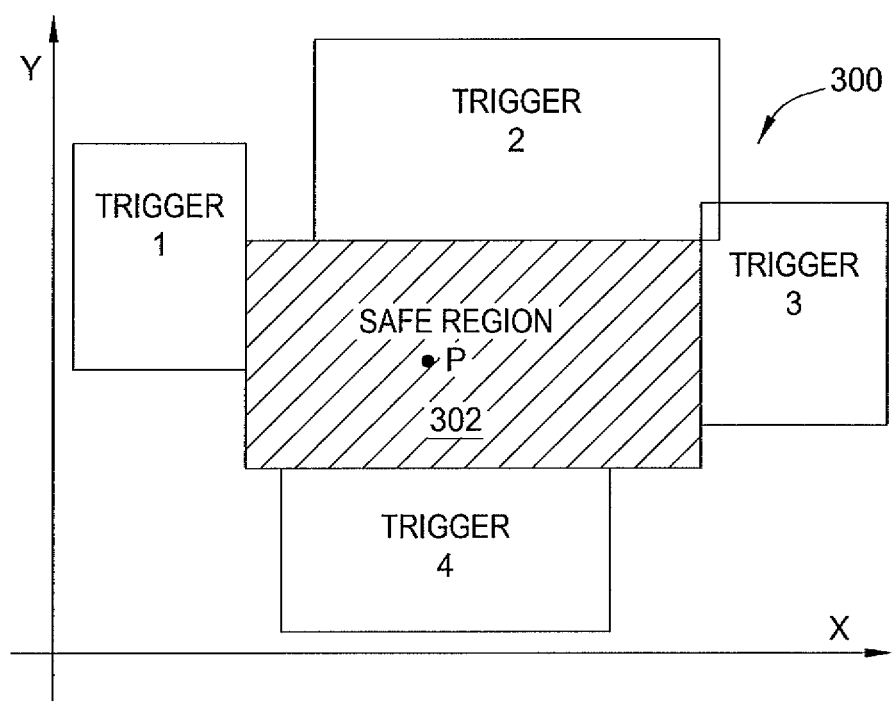
FIG. 3A is a graph illustrating an exemplary user location in a two-dimensional coordinate space.

FIG. 3A is a graph illustrating an exemplary user location P in a two-dimensional coordinate space 300. The spatial regions associated with exemplary triggers 1, 2, 3, and 4 are shown, along with the safe region 302 containing the user at position P.

FIG. 3B is a graph illustrating exemplary one-dimensional value domains associated with each of a plurality of r monitored attributes. Corresponding value ranges for triggers along each of the attributes are displayed. The computed safe value containers are displayed under three different scenarios: (1) when the value of the monitored attribute lies outside any relevant trigger's value range (e.g., as in the case of attribute $a_1$); (2) when the value of the monitored attribute lies inside a single trigger's value range (e.g., as in the case of attribute $a_2$); and (3) when the value of the monitored attribute lies within multiple intersecting triggers' value ranges (e.g., as in the case of attribute $a_r$).

Figure 4:
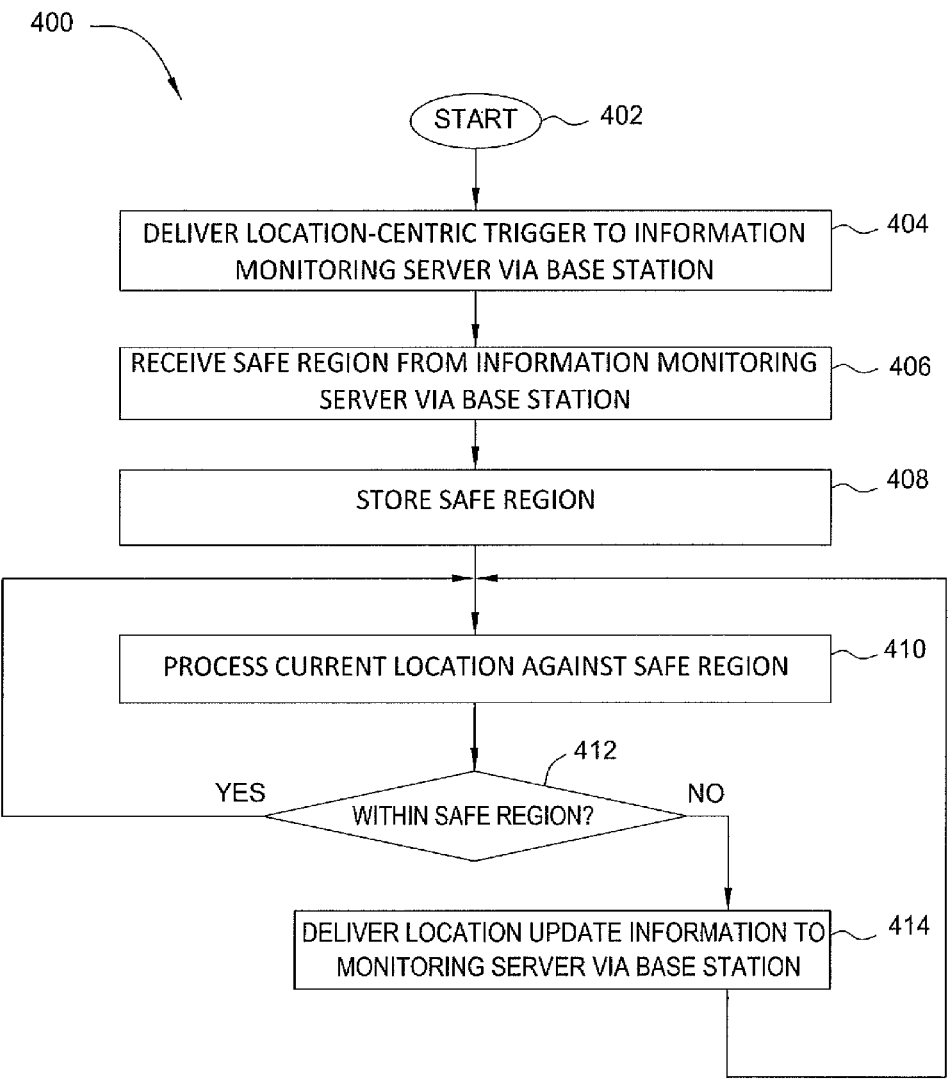
FIG. 4 is a flow diagram illustrating one embodiment of a method for assisting in the processing of location-sensitive data streams, according to the present invention.

FIG. 4 is a flow diagram illustrating one embodiment of a method 400 for assisting in the processing location-sensitive data streams, according to the present invention. The method 400 may be implemented, for example, at a mobile user such as a mobile GPS device.

The method 400 is initialized at step 402 and proceeds to step 404, where the mobile user delivers a location-centric trigger to an information monitoring server (e.g., information monitoring server 102 of FIG. 1), via a base station.

In step 406, the mobile user receives a safe region from the information monitoring server, via the base station. The safe region, as discussed above, indicates a physical location within which the location-centric trigger is not likely to be activated. The mobile user stores the safe region in step 408.

In step 410, the mobile user processes its current location against the stored safe region. In step 412, the mobile user determines whether its current location falls within the safe region.

If the mobile user concludes in step 412 that its current location falls within the safe region, the method 400 returns to step 410, and the mobile user continues to process its location against the stored safe region. Alternatively, if the mobile user concludes in step 412 that its current location does not fall within the safe region, the method 400 proceeds to step 414, and the mobile user delivers a location update to the information monitoring server, via the base station. The method 400 then returns to step 410, and the mobile user continues to process its location against the stored safe region.

Thus, the mobile users use the safe region information to self-monitor their locations. In particular, once a mobile user knows where its safe region is, it can avoid sending location updates to the information monitoring server 102 when it knows that it is inside its safe region. Shifting the location monitoring burden from the information monitoring server 102 to the mobile users allows the mobile users to conserve energy and bandwidth by reducing the number of updates that must be sent. The information monitoring server 102 also conserves energy and bandwidth because the number of updates that it has to process is reduced.

In one embodiment, safe regions are represented as rectangular regions. There are at least three advantages to the rectangular representation: (1) the safe region can be represented compactly through the specification of two points (e.g., bottom-left and top-right corners), making it easy to communicate to the relevant mobile user; (2) mobile users can quickly determine their locations within a rectangular region, which facilitates the self-monitoring of location; and (3) computation of a rectangular safe region requires relatively low processing overhead.

Figure 5A:
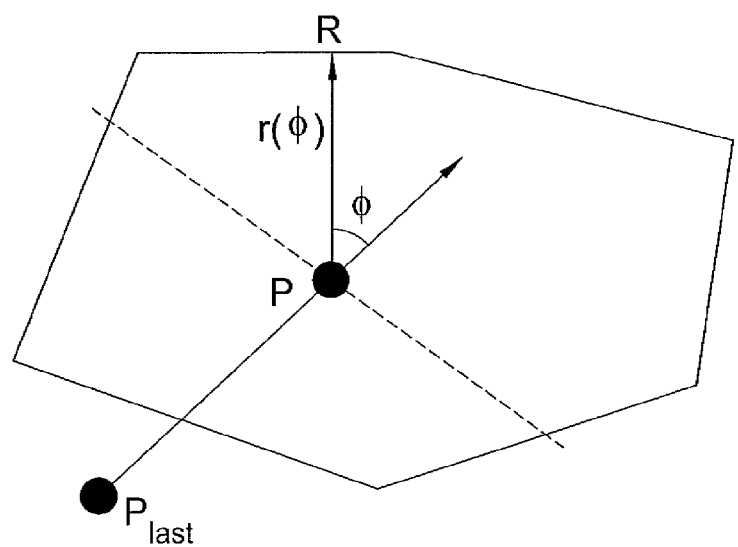
FIG. 5A is a schematic diagram illustrating a mobile user at a location.

FIG. 5A is a schematic diagram illustrating a mobile user at location $\vec{P}$, where $\vec{P}_{last}$ indicates the last-recorded location of the mobile user. The probability density function for the mobile user's motion inside the safe region, denoted by $p(\phi)$, is given by the following density function:

$$p(\varphi) = \begin{cases} \dfrac{1 + \dfrac{s}{t}\left\lceil \dfrac{\pi/2 - |\varphi|}{s/t \cdot \pi} \right\rceil}{2\pi} & \text{if } -\pi/2 \leq \varphi \leq \pi/2 \\ \dfrac{1 - \dfrac{s}{t}\left\lceil \dfrac{|\varphi| - \pi/2}{s/t \cdot \pi} \right\rceil}{2\pi} & \text{otherwise} \end{cases} \quad \text{(EQN. 12)}$$

Figure 5B:
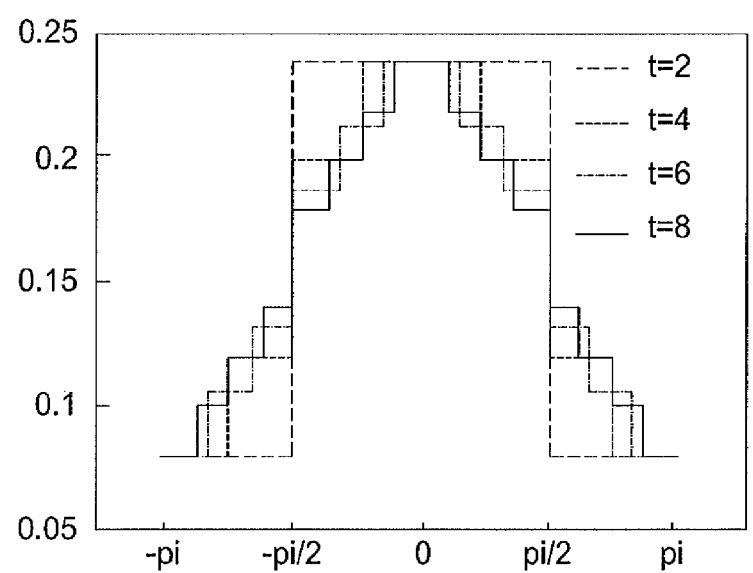
FIG. 5B is a graph illustrating the probability density function for a mobile user's motion inside a safe region.

In EQN. 12, s and t are parameters of steadiness such that s/t<1. FIG. 5B is a graph illustrating the probability density function for the mobile user's motion inside the safe region for s=1 and for different values of t. The value of s in particular determines the weight to be assigned to the probability of the mobile user moving in the same direction, whereas t determines the granularity of change in $\phi$ for which the probability value changes. As illustrated in FIG. 5B, the probability of the mobile user moving in a direction such that $0 \leq \phi \leq \pi/t$ is the same; for values of $\phi > \pi/t$, this probability decreases. Assuming random motion would lead to the probability of motion in any direction being $1/2\pi$.

Assuming that a mobile user moves in a direction $\phi$ as illustrated in FIG. 5A with a speed of v, and assuming a convex safe region $\psi(u_i)$, a last-recorded location $\vec{P}_{last}$, and an updated location $\vec{P}$, the average location update cost $C_{u_i}$ over time can be computed as:

$$C_{u_i} = C_l \cdot \left( \int_{-\pi}^{\pi} \frac{r(\varphi) p(\varphi) d(\varphi)}{2\pi v} \right)^{-1} \quad \text{(EQN. 13)}$$

where $C_l$ is the cost of a single location update, $\phi$ is the angle between the direction of motion of the mobile user and the mobile user's last-recorded direction of motion $\overline{P_{last}P}$, and $r(\phi)$ is the length of the segment $\overline{PR}$ (where R is the point on the safe region boundary at which the next update is expected to occur). Given the angle $\phi$, the elapsed time before the next update is $r(\phi)/v$. The average elapsed time over all values of $\phi$ is given by $$\int_{-\pi}^{\pi} \frac{r(\varphi) p(\varphi) d(\varphi)}{2\pi v}.$$

Thus, the average location update cost $C_{u_i}$ can be re-written as:

$$C_{u_i} = \frac{C_l \cdot 2\pi v}{\lambda(\varphi)} \quad \text{(EQN. 14)}$$

where $$\lambda(\varphi) = \int_{-\pi}^{\pi} r(\varphi) p(\varphi) d(\varphi)$$

is the weighted perimeter of the safe region. In order to minimize the update costs, one must maximize the value of the weighted perimeter. Therefore, the problem of minimizing update costs reduces to finding a rectangular safe region with a maximum weighted perimeter.

In one embodiment, the maximum weighted perimeter safe region for a given mobile user is calculated by calculating the individual safe regions for each of the mobile user's location-centric triggers and then calculating the intersection of these safe regions. In another embodiment, illustrated in greater detail with respect to FIG. 6, the maximum weighted perimeter safe region is calculated for a set of relevant spatial trigger regions for a given mobile user.

Figure 6:
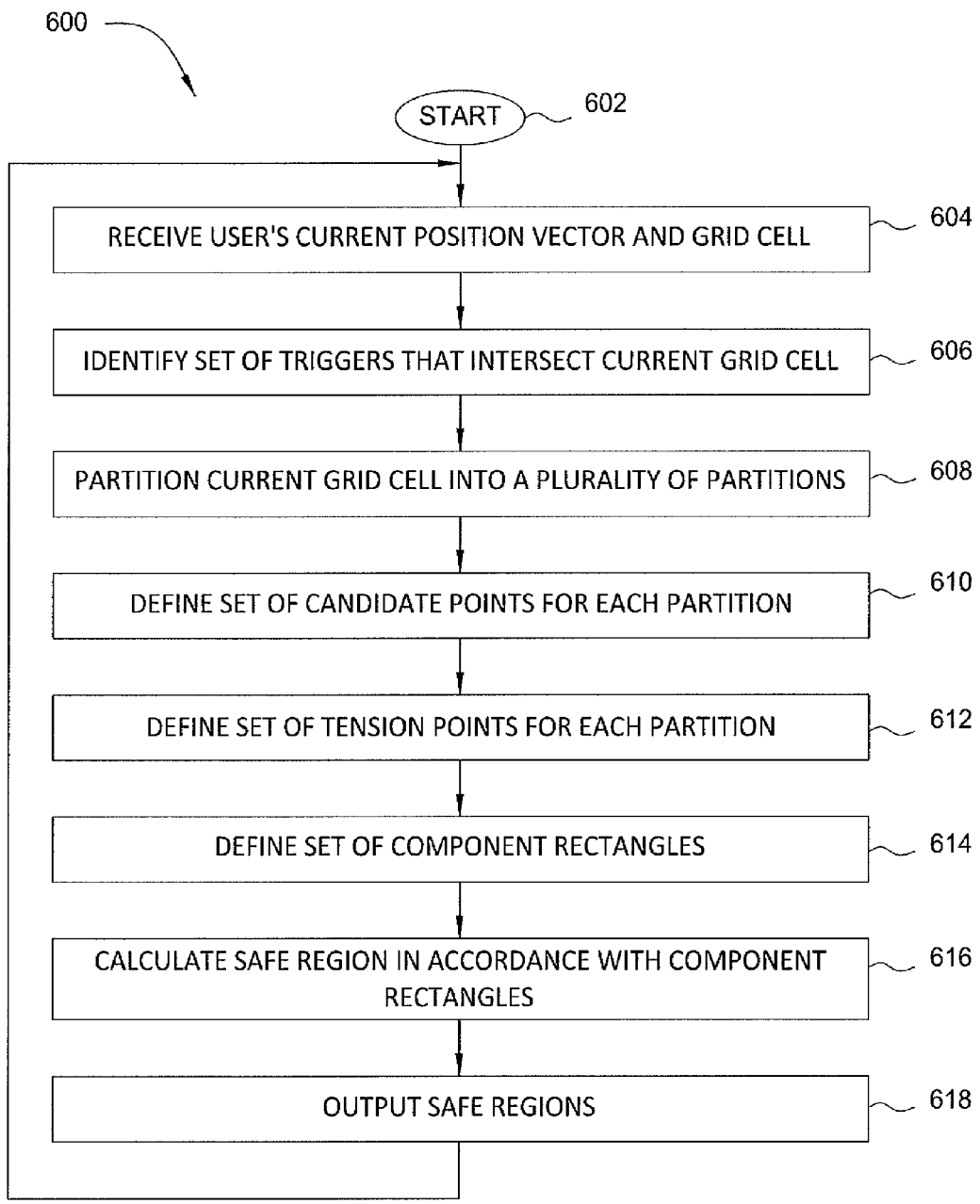
FIG. 6 is a flow diagram illustrating one embodiment of a method for computing a safe region, according to the present invention.

FIG. 6 is a flow diagram illustrating one embodiment of a method 600 for computing a safe region, according to the present invention. Specifically, the method 600 computes a maximum weighted perimeter safe region, as described above. The method 600 may be implemented, for example, in accordance with step 210 of the method 200 and by the information monitoring server 102 illustrated FIG. 1. As such, reference is made in the discussion of the method 600 to various components of the information monitoring server 102. However, it is understood that the method 600 is not limited to operation in conjunction with the information monitoring server 102, and may readily be deployed in systems having different configurations from that illustrated.

In one embodiment, the method 600 reduces computation costs by considering only relevant triggers in the vicinity of the mobile user's current location. In one embodiment, this is achieved by overlaying a grid over the entire universe of discourse U (or map).

The method 600 is initialized at step and proceeds to step 604, where the data processor 108 receives the mobile user's current location vector $\vec{P}$ and the current grid cell $G(\vec{P})$ in which the mobile user resides.

In step 606, the optimizer 112 identifies the set of triggers that intersect the current grid cell $G(\vec{P})$. As discussed above, embodiments of the method 600 consider only these triggers in the calculation of the safe region. In one embodiment, if none of the user's triggers intersect the current grid cell $G(\vec{P})$, then the optimizer 112 returns the entire current grid cell $G(\vec{P})$ as the safe region.

In step 608, the optimizer 112 partitions the current grid cell $G(\vec{P})$ into a plurality of partitions, with the mobile user's current location $\{P_x, P_y\}$ as the origin. In one embodiment, the optimizer 112 partitions the current grid cell $G(\vec{P})$ into four quadrants.

In step 610, the optimizer 112 defines, for each partition, a set of candidate points (cpSetPart). The set of candidate points comprises the set of points that can potentially form a corner of a rectangular safe region. In one embodiment, the set of candidate points is defined by first selecting the spatial region corner of each of the mobile user's triggers as a candidate point in its appropriate partition. For triggers that do not lie completely inside the current grid cell $G(\vec{P})$, the intersection points of the boundary of the current grid cell $G(\vec{P})$ and the trigger spatial region are selected as candidate points instead of the corner points (which fall outside the region of the current grid cell $G(\vec{P})$). In a further embodiment, the set of candidate points is expanded by also selecting, for trigger spatial conditions that intersect the x axis or y axis of the coordinate axes with origin at $\{P_x, P_y\}$, the points of intersection of the triggers with the axes. In a further embodiment still, if no points of intersection with an axis exist, the point of intersection of the axis with the current grid cell $G(\vec{P})$ is added to the set of candidate points.

In one embodiment, the set of candidate points is trimmed. In one embodiment, trimming includes removing, in the case of multiple candidate points in a partition that intersect the x or y axis, all candidate points on this axis except for the one that is closest to the origin. In a further embodiment, all points that dominate any other point in the candidate set are removed. A point $P_1$ dominates a point $P_2$ if $P_1 \cdot x > P_2 \cdot x$ and $P_1 \cdot y > P_2 \cdot y$. In yet another embodiment, the candidate points are sorted according to increasing distance of the x coordinate from the origin. Points with the same x coordinate are arranged in order of decreasing distance of the y coordinate from the origin.

Figure 7A:
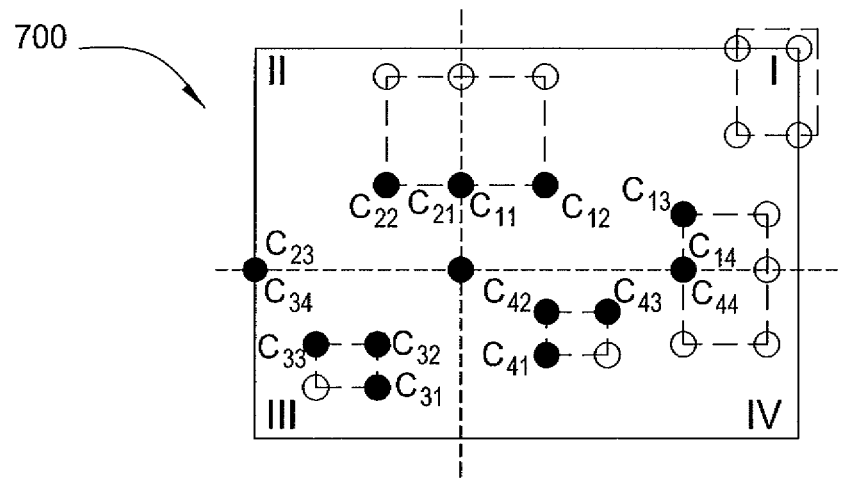
FIG. 7A is a schematic diagram illustrating an exemplary grid cell that is divided into four partitions or quadrants.

FIG. 7A is a schematic diagram illustrating an exemplary grid cell 700 that is divided into four partitions or quadrants, labeled I-IV. As illustrated, a plurality of candidate points (labeled $C_{11}$-$C_{44}$) has been identified within the grid cell 700. Black dots represent the candidate points that have survived trimming, as discussed above, while hollow dots represent candidate points that have been trimmed.

Referring back to FIG. 6, in step 612, the optimizer 112 defines, for each partition, a set of tension points (tpSetPart). Tension points are obtained from candidate points by ensuring that only points that form the largest possible rectangular regions that do not overlap the spatial region of any trigger are selected. In one embodiment, each tension point $T_{Qi}$ (where $Q \in \{1, 2, 3, 4\}$ represents the partition that the tension point belongs to) is assigned to the same x-coordinate as the corresponding candidate point $C_{Qi}$. $T_{Qi}$ is assigned the same y-coordinate as that of $C_{Qi-1}$, or $T_{Qi-1}$ if $T_{Qi}$ and $T_{Qi-1}$ have the same x coordinate. The y-coordinate of $T_{Qi}$ is set as either the top bound of the current grid cell $G(\vec{P})$ or the y-coordinate of a candidate point that intersects the y axis (if any such candidate points exist).

Figure 7B:
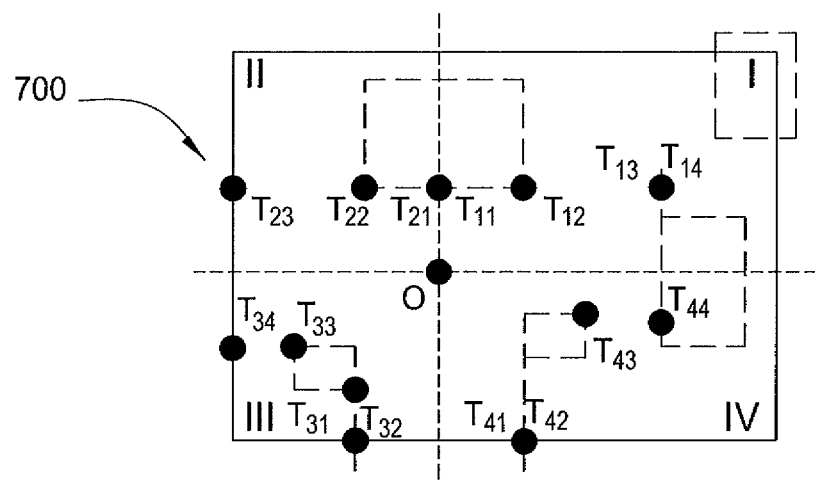
FIG. 7B is a schematic diagram illustrating the exemplary grid cell of FIG. 7A, including a set of tension points obtained from the candidate points illustrated in FIG. 7A.

FIG. 7B is a schematic diagram illustrating the exemplary grid cell 700 of FIG. 7A, including a set of tension points (labeled $T_{11}$-$T_{44}$) obtained from the candidate points illustrated in FIG. 7A. If one imagines an elastic band laid around the set of candidate points, the set of tension points can be obtained by stretching the elastic band to obtain a rectilinear polygonal shape that does not overlap any of the triggers' spatial regions.

Referring back to FIG. 6, in step 614, the optimizer 112 defines a set of component rectangles. The set of tension points forms the opposite corner (i.e., opposite to the origin) of the set of candidate component rectangles in each partition. The safe region that is ultimately calculated is composed of the intersection of the component rectangles from each partition. In one embodiment, component rectangles with the maximum perimeter in each partition are selected, as this will facilitate the calculation of safe regions with the maximum weighted perimeter.

In step 616, the optimizer 112 calculates the safe region in accordance with the component rectangles. In one embodiment, this is accomplished using greedy heuristics that first select the partition in which the probability density function of the expected future movement of the mobile user is maximum. The component rectangle with the largest weighted perimeter in this partition is then selected. Partitions are further selected dependent on the distribution of probability density function values in the partition using the steady motion assumption. At each step, the component rectangle with the largest weighted perimeter is selected, and this continues until all partitions are processed using this greedy heuristic.

Figure 7C:
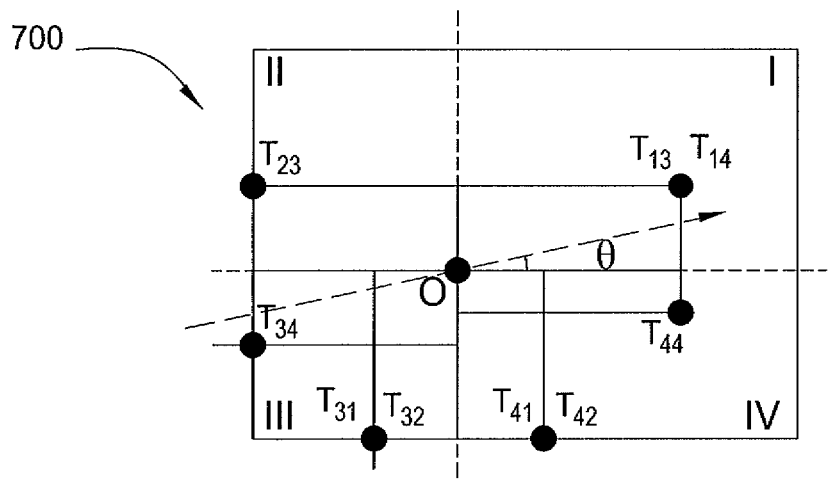
FIG. 7C is a schematic diagram illustrating the exemplary grid cell of FIGS. 7A-B, including a set of component rectangles obtained from the tension points illustrated in FIG. 7B.

FIG. 7C is a schematic diagram illustrating the exemplary grid cell 700 of FIGS. 7A-B, including a set of component rectangles obtained from the tension points illustrated in FIG. 7B. As illustrated, the largest component rectangle in Quadrant I is first selected, since the probability density function values for mobile user movement are maximum in this quadrant. The next quadrant (i.e., Quadrant IV) is selected in a clockwise manner; probability density function values of motion direction are expected to be higher in Quadrant IV because the angle θ illustrated in FIG. 7C is such that $\theta < \pi/4$. If the value of the angle θ was greater than $\pi/4$, Quadrant II would be selected next rather than Quadrant IV. Addition of the component rectangle at tension point $T_{44}$ provides a safe region with a larger perimeter than the safe region obtained by adding the component rectangle with the tension point $T_{41}$, $T_{42}$. Finally, the component rectangles with tension points at $T_{23}$ in Quadrant II and $T_{34}$ in Quadrant III (selected in order of increasing expected probability density function values) are selected.

Figure 7D:
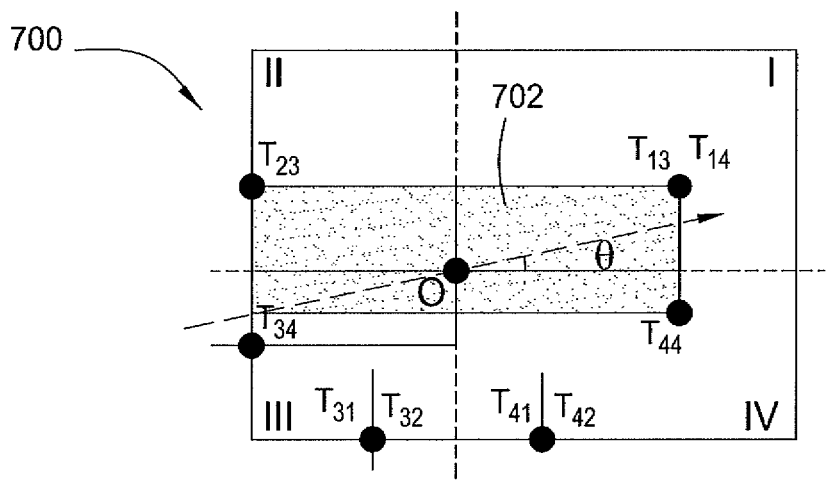
FIG. 7D is a schematic diagram illustrating the exemplary grid cell of FIGS. 7A-C, in which a final safe region composed of the component rectangles illustrated in FIG. 7C is selected.

FIG. 7D is a schematic diagram illustrating the exemplary grid cell 700 of FIGS. 7A-C, in which a final safe region 702 composed of the component rectangles illustrated in FIG. 7C is selected.

The data manger 116 outputs the safe regions to the mobile users in step 618. The method 600 then returns to step 604, and proceeds as described above to process a new location vector and grid cell.

As discussed above, each location-centric trigger may also have a non-spatial predicate condition that requires monitoring of a non-spatial attribute $a_j^k$ (e.g., the price of gas at a location of interest). Each monitored attribute $a_j^k$ at (a location of interest/has at least one safe value container $\delta_k(l_j)$ associated with it. The following condition holds true for any safe value container $P_r[m_{l_j}(t) \Rightarrow_{\geq 1} T_j | \exists k \in [1 \ldots r], a_j^k \in \delta(l_j)] = 0$ which implies that if the value of even a single monitored attribute at a location of interest lies within the corresponding safe value container, the probability of any relevant triggers being activated is zero.

In one embodiment, the safe value containers are constructed to satisfy at least three goals: (1) quick calculation of the safe value containers (since calculation must be performed for each of the r monitored attributes at each location of interest); (2) quick containment check to verify that the current monitored attribute value lies within a one-dimensional value range; and (3) maximization of the value range covered by the safe value containers, so as to minimize the number of updates that need to be processed by the location monitoring server 102.

In one embodiment, the safe value containers for any monitored attribute comprise either a set of multiple safe value containers or a single safe value container. Multiple safe value containers reduce the number of updates for low update frequency data streams and data streams with high rates of change of data values, where the values of the monitored data may jump from one safe value container to another.

Figure 10A:
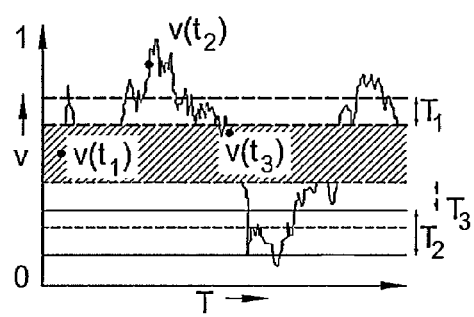
FIG. 10A illustrates the use of a single safe value container.
Figure 10B:
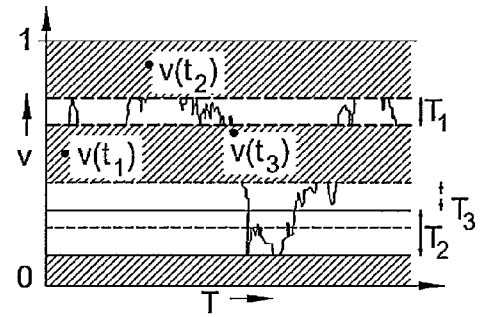
FIG. 10B illustrates the use of single multiple safe value containers.

FIGS. 10A-B, for example, respectively illustrate the use of single and multiple safe value containers. In particular, FIG. 10A illustrates a single safe value container being invalidated at time instant $t_2$ when a monitored data source delivers data exhibiting a high rate of change and a low update frequency. By contrast, FIG. 10B illustrates that the use of multiple safe value containers eliminates the need to recomputed the safe value containers at time instants $t_2$ and $t_3$.

Figure 8:
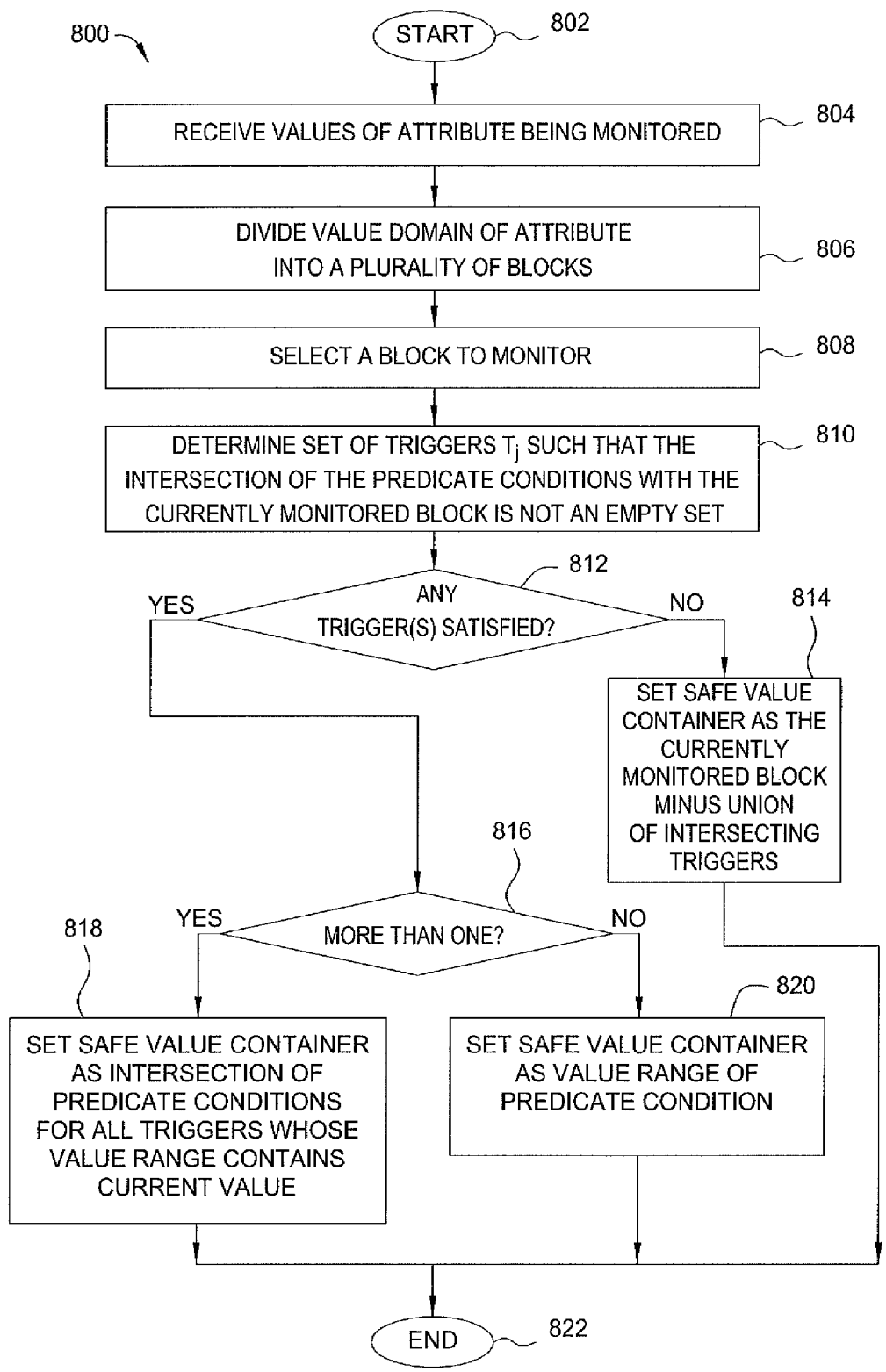
FIG. 8 is a flow diagram illustrating one embodiment of a method for computing a safe value container, according to the present invention.

FIG. 8 is a flow diagram illustrating one embodiment of a method 800 for computing a safe value container, according to the present invention. The method 800 may be implemented, for example, in accordance with step 210 of the method 200 and by the information monitoring server 102 illustrated FIG. 1. As such, reference is made in the discussion of the method 800 to various components of the information monitoring server 102. However, it is understood that the method 800 is not limited to operation in conjunction with the information monitoring server 102, and may readily be deployed in systems having different configurations from that illustrated.

The method 800 is initialized at step 802 and proceeds to step 804, where the optimizer 112 receives the values of an attribute being monitored. For ease of explanation, the method 800 describes monitoring the values for a single attribute; however, it will be appreciated that the method 800 can just as easily be implemented to monitor values for multiple attributes.

In step 806, the optimizer 112 divides the entire value domain of the attribute into a plurality of equally sized blocks. This reduces the computation costs associated with calculating the safe value containers, since only triggers whose attribute value range intersects the current monitored block are considered for the purposes of safe value container calculation. Consider, for example, the monitored attribute values $a = \{a_1, a_2, \ldots, a_r\}$ and the corresponding blocks identified as $B(a_1), B(a_2), \ldots, B(a_r)$, respectively. Further consider the calculation of safe value containers for the $k^{th}$ attribute $a_k$.

In step 808, the optimizer selects the block $B(a_k)$ to monitor as the block in which the current value of attribute $a_k$ lies. The method 800 then proceeds to step 810, where the optimizer 112 determines the set $T_j$ of triggers such that the intersection of the predicate conditions of the triggers with the currently monitored block is not an empty set. In other words, the optimizer 112 determines the set $T_j$ of triggers such that $R_{i,j}^k \cap B(a_k) \neq \lfloor$.

In step 812, the optimizer 112 determines whether, for any of the triggers in the set $T_j$ of triggers, the monitored attribute value satisfies the predicate conditions. In other words, the optimizer 112 determines whether for any of the triggers $t_{i,j} \in T_j$, $m_{l_j}(t) \cdot a_k \in R_{i,j}^k$.

If the optimizer 112 concludes in step 812 that the monitored attribute value does not satisfy the predicate condition for any of the triggers in the set $T_j$, the safe value container is set in step 814 as the currently monitored block minus the union of the predicate conditions for all triggers that intersect the currently monitored block. In other words, the safe value container is set as $B(a_k) - (R_{1,j}^k \cup R_{2,j}^k \cup \ldots R_{q,j}^k)$, where q denotes the number of triggers that intersect the currently monitored block $B(a_k)$. The method 800 then terminates in step 812.

Alternatively, if the optimizer 112 concludes in step 812 that the monitored attribute value satisfies the predicate condition for at least one of the triggers in the set $T_j$, the method 800 proceeds to step 816, where the optimizer determines whether more than one trigger is satisfied by the monitored attribute value.

If the optimizer 112 concludes in step 816 that the monitored attribute value satisfies the predicate condition for more than one of the triggers in the set $T_j$, the method 800 proceeds to step 818, and the optimizer 112 sets the safe value container as the intersection of the predicate conditions for all triggers whose value range contains the value of the currently monitored attribute. In other words, the safe value container is set as $R_{1,j}^k \cap R_{2,j}^k \cap \ldots R_{p,j}^k$, where p denotes the number of triggers whose value range contains the value $m_{l_j}(t) \cdot a_k$. The method 800 then terminates in step 812.

Alternatively, if the optimizer 112 concludes in step 816 that the monitored attribute value satisfies the predicate condition for only one of the triggers in the set $T_j$, the method 800 proceeds to step 820, and the optimizer 112 sets the safe value container to the value range of the predicate condition. In other words, the safe value container is set as $R_{i,j}^k$. The method 800 then terminates in step 812.

Figure 9:
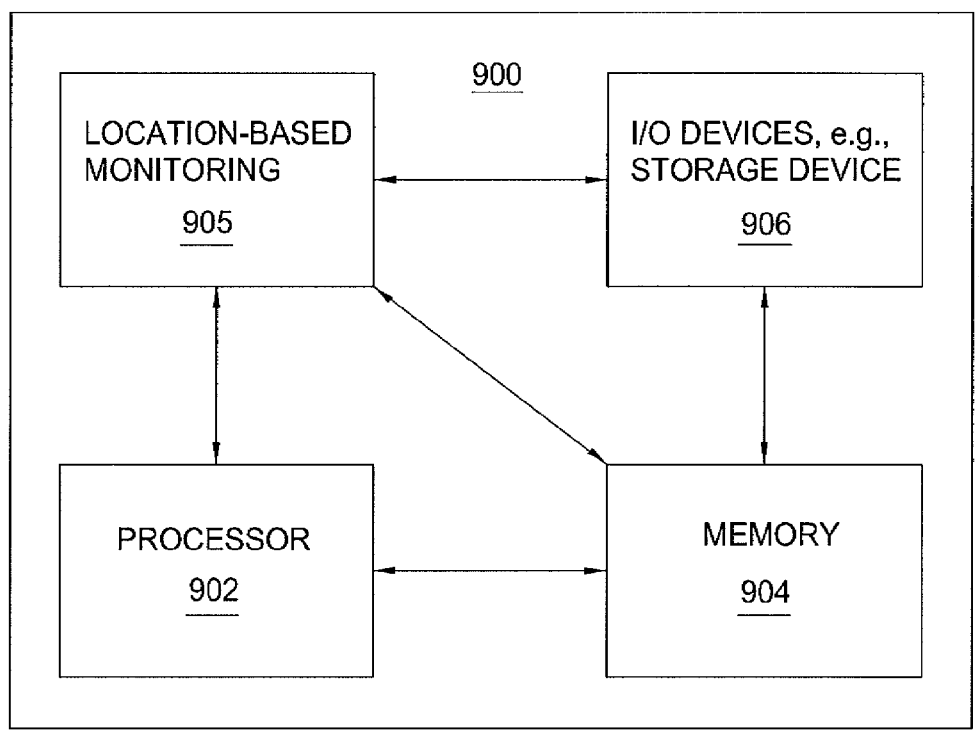
FIG. 9 is a high-level block diagram of the location-based monitoring method that is implemented using a general purpose computing device.

FIG. 9 is a high-level block diagram of the location-based monitoring method that is implemented using a general purpose computing device 900. In one embodiment, a general purpose computing device 900 comprises a processor 902, a memory 904, a location-based monitoring module 905 and various input/output (I/O) devices 906 such as a display, a keyboard, a mouse, a stylus, a wireless network access card, an Ethernet interface, and the like. In one embodiment, at least one I/O device is a storage device (e.g., a disk drive, an optical disk drive, a floppy disk drive). It should be understood that the location-based monitoring module 905 can be implemented as a physical device or subsystem that is coupled to a processor through a communication channel.

Alternatively, the location-based monitoring module 905 can be represented by one or more software applications (or even a combination of software and hardware, e.g., using Application Specific Integrated Circuits (ASIC)), where the software is loaded from a storage medium (e.g., I/O devices 906) and operated by the processor 902 in the memory 904 of the general purpose computing device 900. Thus, in one embodiment, the location-based monitoring module 905 for providing fault tolerance for stream processing applications, as described herein with reference to the preceding figures, can be stored on a computer readable storage medium (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying figures that recite a determining operation or involve a decision, do not necessarily require that both branches of the determining operation be practiced. In other words, one of the branches of the determining operation can be deemed as an optional step.

While the foregoing is directed to embodiments of the present invention, other and further embodiments of the invention may be devised without departing from the basic scope thereof. Various embodiments presented herein, or portions thereof, may be combined to create further embodiments. Furthermore, terms such as top, side, bottom, front, back, and the like are relative or positional terms and are used with respect to the exemplary embodiments illustrated in the figures, and as such these terms may be interchangeable.

What is claimed is:

1. A method for assisting in processing a plurality of incoming data streams, the plurality of incoming data streams comprising a first data stream that specifies one or more locations of a mobile user at one or more times and a second data stream that specifies one or more values of a monitored attribute at a location of interest at one or more times, the method comprising:
    delivering a location-centric trigger to a location-based information monitoring system, the location-centric trigger specifying at least one spatial predicate condition relevant to the location of interest and at least one non-spatial predicate condition relevant to the location of interest;
    receiving a safe region from the location-based information monitoring system, the safe region comprising at least one of the one or more locations whose probability of satisfying the spatial predicate condition falls below a first predefined threshold, wherein the safe region comprises a rectangle having a maximum weighted perimeter;
    processing a current location of the mobile user against the safe region; and
    delivering the current location to the location-based information monitoring system only if the current location lies outside of the safe region,
    wherein at least one of: the delivering the location-centric trigger, the receiving, the processing, or the delivering the current location is performed using a processor.

2. An apparatus comprising computer readable storage medium containing an executable program for assisting in processing a plurality of incoming data streams, the plurality of incoming data streams comprising a first data stream that specifies one or more locations of a mobile user at one or more times and a second data stream that specifies one or more values of a monitored attribute at a location of interest at one or more times, where the program performs steps comprising:
    delivering a location-centric trigger to a location-based information monitoring system, the location-centric trigger specifying at least one spatial predicate condition relevant to the location of interest and at least one non-spatial predicate condition relevant to the location of interest;
    receiving a safe region from the location-based information monitoring system, the safe region comprising at least one of the one or more locations whose probability of satisfying the spatial predicate condition falls below a first predefined threshold, wherein the safe region comprises a rectangle having a maximum weighted perimeter;
    processing a current location of the mobile user against the safe region; and
    delivering the current location to the location-based information monitoring system only if the current location lies outside of the safe region.

3. The method of claim 1, wherein the processor is part of a mobile device operated by the mobile user.

4. The method of claim 1, further comprising:
    receiving an update from the location-based information monitoring system after the delivering, wherein the update indicates that the location-centric trigger has been satisfied.

5. The method of claim 1, further comprising:
    storing the safe region in a location accessible to the processor.

6. The method of claim 5, further comprising:
    periodically re-processing the current location against the safe region.

7. The method of claim 1, wherein the maximum weighted perimeter comprises an intersection of a plurality of safe regions associated with the mobile user.

8. The apparatus of claim 2, wherein the executable program is executed by a processor that is part of a mobile device operated by the mobile user.

9. The apparatus of claim 2, wherein the steps further comprise:
    receiving an update from the location-based information monitoring system after the delivering, wherein the update indicates that the location-centric trigger has been satisfied.

10. The apparatus of claim 2, wherein the steps further comprise:
    storing the safe region in a location accessible to the processor.

11. The apparatus of claim 10, wherein the steps further comprise:
    periodically re-processing the current location against the safe region.

12. The apparatus of claim 2, wherein the maximum weighted perimeter comprises an intersection of a plurality of safe regions associated with the mobile user.

* * * * *